J. J. McCARTHY.
FLAT IRON HEATER.
APPLICATION FILED DEC. 29, 1908.

919,060.

Patented Apr. 20, 1909.

Witnesses:

Inventor
John J. McCarthy
By James N. Ramsey
Attorney

UNITED STATES PATENT OFFICE.

JOHN J. McCARTHY, OF NEWPORT, KENTUCKY.

FLAT-IRON HEATER.

No. 919,060.　　　Specification of Letters Patent.　　　Patented April 20, 1909.

Application filed December 29, 1908. Serial No. 469,787.

*To all whom it may concern:*

Be it known that I, JOHN J. MCCARTHY, a citizen of the United States, residing at Newport, in the county of Campbell and State of Kentucky, have invented certain new and useful Improvements in Flat-Iron Heaters, of which the following is a specification.

My invention relates to flat iron heaters, and its object is to produce a device of this character that will combine the required efficiency in operation and economy in the use of fuel with the simplicity of construction that will permit of the use of the best material for the purpose of affording economy of heat and durability of the apparatus.

My invention consists in an integral cylindrical casing having its part near its upper edge turned in and a flange formed therearound, a circular integral lid separable from the casing and adapted to rest on the flange and to close the top of the casing but to be readily removed to allow access thereto, and a circular bottom for the casing comprising a disk, of less diameter than that of the interior of the casing near its bottom, having, integrally formed therewith, a plurality of radially outwardly and downwardly extending legs which are rigidly attached to the casing near its lower edge, which details of construction and the operation of which device will be more fully hereinafter set forth and claimed.

Figure 1:
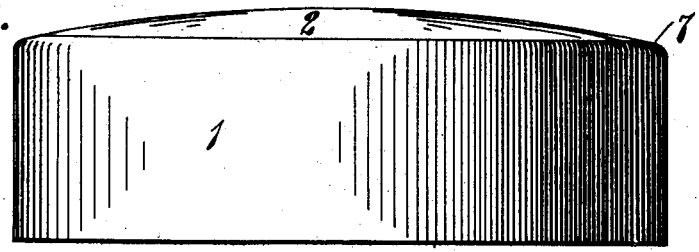
Figure 2:
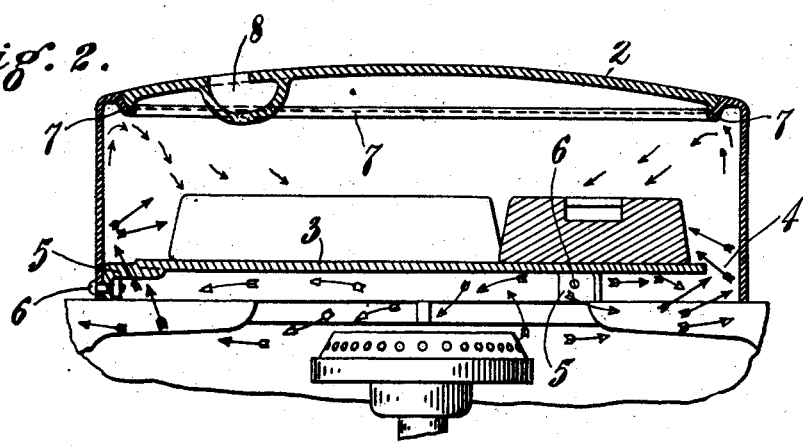
Figure 3:
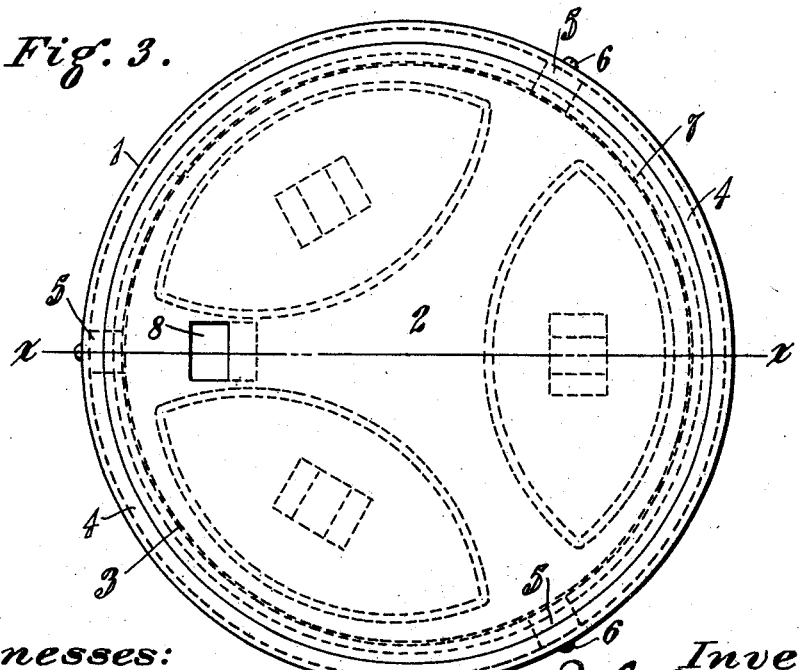

In the drawing: Figure 1 is a side elevation of my improved heater. Fig. 2 is a cross section on a line corresponding to the line *x—x* of Fig. 3, also illustrating part of a gas stove with which I prefer to use my improved heater. Fig. 3 is a plan view of the heater with the flat irons in place therein.

My improved flat iron heater consists in the cylindrical casing 1 having the removable lid 2 at its top, the removal of which lid allows free access to the interior from the top. The bottom 3 of the casing consists in a disk of considerably less diameter than the inner diameter of the casing, so that when it is centrally located therein an annular space 4 is left between the inside of the casing and the periphery of the bottom. The bottom 3 has a plurality of radially outwardly and downwardly extending legs 5 formed integrally therewith and being so proportioned that they may be firmly attached to the sides of the casing by means of the bolts 6 taking through the sides of the casing and the legs. As shown these legs are three in number.

The part of the casing near its upper edge is curved inwardly continuously therearound, so that, as well as forming a flange 7 on which the periphery of the lid 2 may rest when the lid is in position to cover the opening in the top of the casing, this inward turning of the upper part of the casing serves to deflect air currents downward toward the irons which are being heated in the casing. The direction of such air currents, as acted upon by the inwardly turned part of the casing, is illustrated by the small arrows as shown in Fig. 2 of the drawing.

The lid 2 is not attached to the casing but, as hereinbefore described merely rests on the flange formed by the inward turning of the upper part of the casing. The lid is provided with a socket 8 into which an ordinary lid lifter may be conveniently inserted for removing and replacing the lid. Thus, all trouble, due to heating of handles permanently attached to the device, is avoided, and the convenience of opening the heater while handling the irons is increased.

The open space is left around the bottom 3 in order to allow the free radiation of heat upwardly from the flames passing from the burner under the heater. The direction of the flames is indicated in Fig. 2, of the drawing, by the large arrows, while the direction of the heat as radiated upwardly through the space around the bottom interiorly of the casing is indicated by the large dark arrows. The extension of the lower edge of the casing below the bottom is especially advantageous in retarding the passage of the flames from the burner outwardly from under the heater, thereby securing increased radiation from the flames upwardly through the space 4 to the interior of the heater.

My improved flat iron heater, while thus affording all the advantages of operation and convenience in use, is of simple construction adapting it for economical production and affording an especial advantage in that it may be constructed of cast iron throughout and be thereby best adapted for withstanding the action of the heat and for communicating the heat to the irons within it.

Having fully described my invention, what I claim as new and desire to secure by Letters Patent is:

As a new and improved article of manufacture, the herein described flat iron heater comprising an integral cylindrical casing having its part near its upper edge turned inwardly therearound to form a flange adapted to direct the heat downwardly onto the irons contained within the casing, a circular lid separable from the casing and adapted to rest with its periphery on the flange of the casing, provided with a socket for the insertion of an ordinary lid lifter, and a bottom for the casing, comprising a disk having integrally formed radially outwardly and downwardly extending legs rigidly secured to the interior wall of the casing near its lower edge, said bottom being of less diameter than the interior wall of the casing, whereby a space is left therearound, and the wall of the casing extending below the bottom to form a baffle, as herein set forth.

JOHN J. McCARTHY.

Witnesses:
 JAMES N. RAMSEY,
 CLARENCE PERDEW.